(12) United States Patent
Jeong et al.

(10) Patent No.: US 8,203,567 B2
(45) Date of Patent: Jun. 19, 2012

(54) GRAPHICS PROCESSING METHOD AND APPARATUS IMPLEMENTING WINDOW SYSTEM

(75) Inventors: Dong-kyun Jeong, Seongnam-si (KR); Soo-chan Lim, Suwon-si (KR); Na-min Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 12/497,595

(22) Filed: Jul. 3, 2009

(65) Prior Publication Data

US 2010/0085367 A1 Apr. 8, 2010

(30) Foreign Application Priority Data

Oct. 2, 2008 (KR) .................. 10-2008-0096953

(51) Int. Cl.
*G06T 1/00* (2006.01)

(52) U.S. Cl. ........ 345/522; 345/501; 345/502; 345/519; 712/2; 712/3; 712/222; 717/136; 719/328

(58) Field of Classification Search .................. None
See application file for complete search history.

(56) References Cited

U.S. PATENT DOCUMENTS

| | | | |
|---|---|---|---|
| 7,126,606 B2 | 10/2006 | Beda et al. | |
| 2005/0088452 A1 | 4/2005 | Hanggie et al. | |
| 2006/0061579 A1* | 3/2006 | Washizu | 345/503 |
| 2008/0134218 A1* | 6/2008 | Kim | 719/328 |
| 2008/0201695 A1* | 8/2008 | Zhou | 717/136 |
| 2009/0184977 A1* | 7/2009 | Weybrew et al. | 345/604 |

FOREIGN PATENT DOCUMENTS

| | | |
|---|---|---|
| KR | 10-2004-0086043 | 10/2004 |
| KR | 10-2006-0006272 | 1/2006 |
| KR | 10-2006-0105421 | 10/2006 |
| KR | 10-2006-0108979 | 10/2006 |
| KR | 10/0803947 | 2/2008 |
| WO | WO 98/45815 | 10/1998 |
| WO | WO 2004/027707 | 4/2004 |

OTHER PUBLICATIONS

"OpenVG Specification Version 1.0.1" Jan. 26, 2007. pp. 1-201. Date accessed Sep. 30, 2011 via web @ http://www.khronos.org/registry/vg/specs/openvg_1_0_1.pdf.*

* cited by examiner

*Primary Examiner* — Antonio A Caschera
(74) *Attorney, Agent, or Firm* — NSIP Law

(57) ABSTRACT

A graphics processing method and apparatus described herein is capable of converting graphics processing of a window system into a vector-based application program interface (API) format usable in the GPU and performing the converted graphics processing in the GPU. For example, the vector-based API may be based on an OpenVG standard or an EGL standard.

7 Claims, 3 Drawing Sheets

GRAPHICS PROCESSING METHOD AND APPARATUS IMPLEMENTING WINDOW SYSTEM

CROSS-REFERENCE TO RELATED APPLICATION(S)

This application claims the benefit under 35 U.S.C. §119 (a) of a Korean Patent Application No. 10-2008-96953, filed Oct. 2, 2008 in the Korean Intellectual Property Office, the disclosure of which is incorporated by reference in its entirety for all purposes.

BACKGROUND

1. Field

The following description relates to graphics processing, and more particularly, to a graphics processing method and apparatus implementing a window system.

2. Description of the Related Art

A number of mobile devices are equipped with open-source-based operating systems such as Linux and Symbian. Also, various mobile devices, such as portable multimedia communication terminals and mobile phones, support web browsing, various application programs, and the like. Accordingly, high-performance graphics processing to support graphic user interfaces (GUIs) of mobile devices is desired.

For high-performance graphics processing, a mobile device includes a separate graphics processing unit (GPU) in addition to a central processing unit (CPU), to perform tasks related to graphics processing. Additionally, in mobile devices, the GUIs of application programs are typically generated according to a window system. That is, a GUI screen of an application program is displayed in a predetermined area called a window.

In general, management and graphics processing of a window is performed by a CPU. However, when complex graphics processing is performed by only the CPU, a considerable load is placed on the CPU, which may lead to deterioration of graphics processing performance. Even if window management and graphics processing are handled by a GPU, there are difficulties in extending or altering functions of the window system, because different applications may use incompatible Application Program Interfaces (APIs).

SUMMARY

In one general aspect, a graphics processing method of a graphics processing unit (GPU) includes converting a graphics processing of a window system into a vector-based application program interface (API) format accessible by the GPU, and performing, by the GPU, the converted graphics processing.

The vector-based API format may be based on an OpenVG standard or an Embedded Graphics Library (EGL) standard.

The converting of the graphics processing may further include transforming a coordinate system of the window system to an OpenVG coordinate system, expressing contexts for the graphics processing of the window system as OpenVG objects, performing the graphics processing with the OpenVG objects, and storing the output of the graphics processing.

The expressing contexts for the graphics processing of the window system as the OpenVG objects may further include expressing contents of the contexts for the graphics processing of the window system as state objects, paint objects and path objects based on the OpenVG standard.

In response to the graphics processing not being processable by the GPU, the method may include transferring contents of contexts for the graphics processing to a central processing unit (CPU) and performing the graphics processing in the CPU.

Graphics resources for performing the graphics processing of the window system may be managed by an EGL surface, and the EGL surface may be implemented by an EGL extension.

The GPU may exchange graphics resources with a central processing unit (CPU), and the GPU may access a memory of the CPU.

The GPU may transfer graphics resources that have not been accessed for a longest period of time to the memory of the CPU as a VGImage.

In response to an access to the graphics resources transferred to the memory of the CPU being performed, the GPU may load the graphics resources into GPU memory as a VGImage.

OpenVG and EGL APIs based on the OpenVG and EGL standards may be implemented together with a unique API of the window system.

In another general aspect, a graphics processing unit (GPU) includes a device-dependent processor which converts a graphics processing of a window system into a vector-based application program interface (API) format accessible by the GPU and performs the converted graphics processing.

The vector-based API format may be based on an OpenVG standard and an Embedded Graphics Library (EGL) standard.

The device-dependent processor may transform a coordinate system of the window system into an OpenVG coordinate system, express contexts for the graphics processing of the window system as OpenVG objects, perform the graphics processing with the OpenVG objects, and store the output of the graphics processing.

The device-dependent processor may express contents of the contexts for the graphics processing of the window system as state objects, paint objects, and path objects based on the OpenVG standard.

The GPU may further include an OpenVG/EGL extension which provides an interface for implementing by a client application a GUI application according to OpenVG/EGL API.

However, other features and aspects will be apparent from the following description, the drawings, and the claims.

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The detailed description is provided to assist the reader in gaining a comprehensive understanding of the methods, apparatuses and/or systems described herein. Accordingly, various changes, modifications, and equivalents of the systems, apparatuses, and/or methods described herein will be suggested to those of ordinary skill in the art. Also, descriptions of well-known functions and constructions may be omitted to increase clarity and conciseness.

Figure 1:
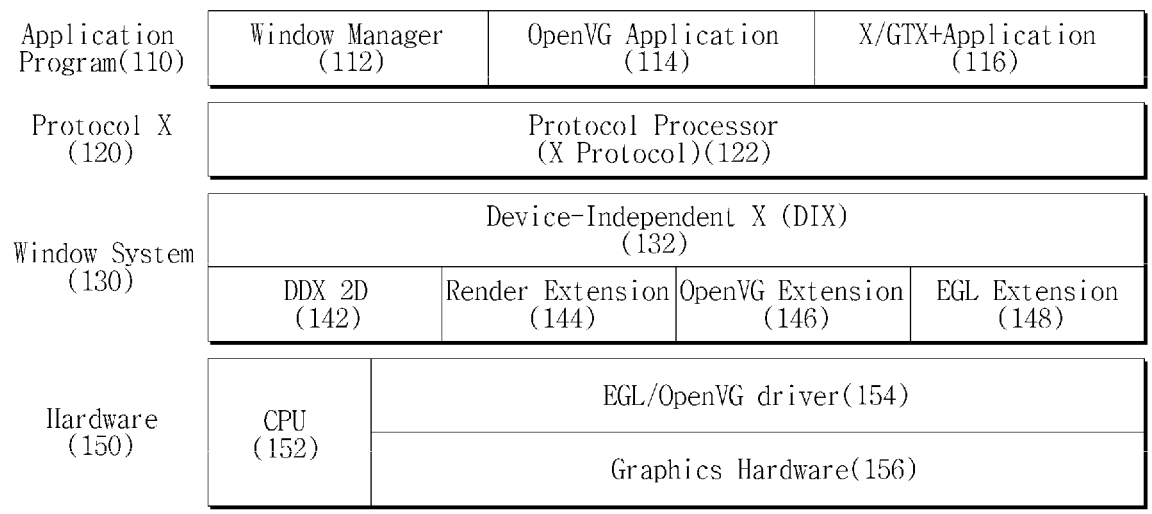
FIG. 1 is a block diagram illustrating an exemplary implementation of a window system.

FIG. 1 is a block diagram illustrating an exemplary implementation of a window system 130.

Application programs 110 may exchange data with the window system 130 through X protocol 120, and may also exchange data with hardware 150, for graphics processing.

The application programs 110 may include various window-based programs, such as a window manager 112, an OpenVG application 114, an X/GTK+application 116, and the like. The window manager 112, a window management program, provides a graphic user interface (GUI). Menu configuration, scroll bars, icons, mouse button manipulation, and the like may be included on a window based upon the type of window manager.

Predetermined protocols may be transmitted between the application programs 110 and window system 130 through protocol processor 122. The window system 130 may include a device-independent processor (Device-Independent X (DIX)) 132, a device-dependent processor (Device-Dependent X 2-Dimension (DDX 2D)) 142, a render extension 144, an OpenVG extension 146, and an embedded graphics library (EGL) extension 148. The hardware 150 may include a CPU 152, an EGL/OpenVG driver 154 and graphics hardware 156.

The device-dependent processor 142 transforms the coordinate system of the window system 130 to an OpenVG coordinate system, expresses contexts for graphics processing of the window system 130 as OpenVG objects based on an OpenVG standard, performs the graphics processing according to the OpenVG objects, and stores the results of the graphics processing. For example, the device-dependent processor 142 expresses the contents of the contexts for graphics processing of the window system 130 as state, paint, and path objects, according to the OpenVG standard. A further description regarding the operation of the device-dependent processor 142 is described below with reference to FIGS. 2 and 3.

OpenVG extension 146 and EGL extension 148 provide an interface through which a client application may implement a GUI application using OpenVG and EGL APIs.

The OpenVG standard is a royalty-free, cross-platform API that provides a low-level hardware acceleration interface for vector graphic libraries, such as Flash, Scalable Vector Graphics (SVG), and the like. The OpenVG standard was established by the Khronos group, and OpenVG version 1.0 was publicly released on July 2005. An OpenVG reference model may be implemented by an EGL block and an OpenVG block. EGL is an interface between the rendering API, such as OpenGL/ES or OpenVG, and the underlying native platform window system. That is, EGL provides a mechanism to create a rendering surface that is to be drawn by client APIs.

Figure 2:
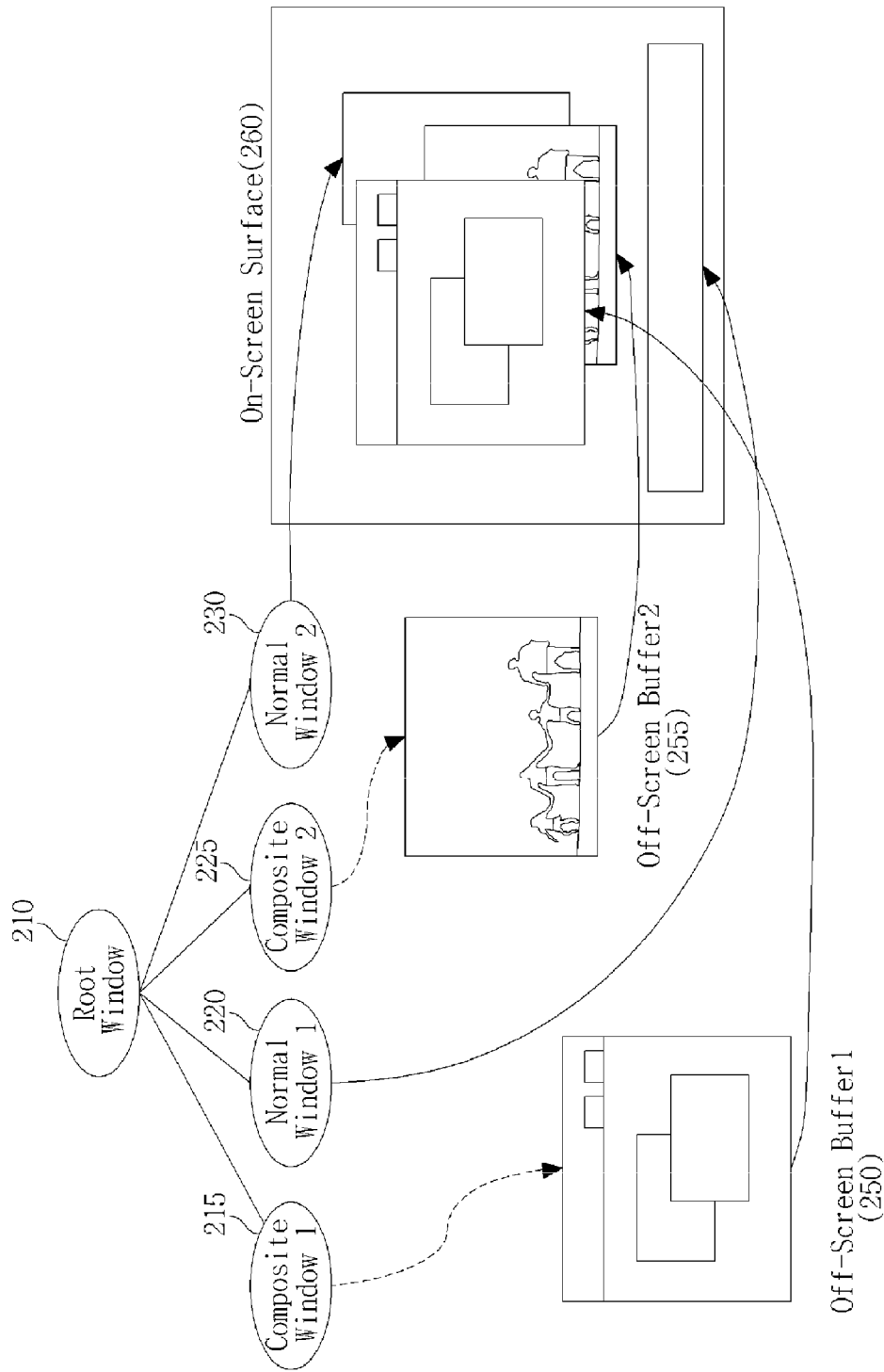
FIG. 2 is a diagram illustrating an exemplary window structure managed by a window system, and an example of mapping the window structure to embedded graphics library (EGL) resources and displaying the results of the mapping on a screen.

FIG. 2 is a diagram illustrating an exemplary window structure managed by a window system, and an example of mapping the window structure to EGL resources and displaying the results of the mapping on a screen.

When a picture is drawn according graphics processing, as described above, a specific area on which the picture is drawn is referred to as a Window. A picture may also be drawn on an area other than the Window from which the picture is shown directly, and this area is referred to as a Pixmap. A Window and a Pixmap may both be referred to as "Drawable". A Window is an on-screen Drawable, and a Pixmap is an off-screen Drawable. In one example, a Window and a Pixmap may be transformed to the EGL variable type, for performing window processing in a GPU.

Referring to FIG. 2, a root window 210 may include composite windows 215 and 225 and normal windows 220 and 230. Here, the composite windows 215 and 225 are not directly displayed on a screen, and each corresponds to a Pixmap. The normal windows 220 and 230 are directly displayed on the screen and, each corresponds to a Window.

For the Windows, such as the normal windows 220 and 230, an on-screen surface 260 is allocated through the EGL extension and the respective plane of the normal windows 220 and 230 point to locations indicating predetermined areas of the on-screen surface 260. Accordingly, contents drawn on the normal windows 220 and 230 are displayed on the screen in the on-screen surface 260.

For the Pixmaps, such as the composite windows 215 and 225, VGImages are allocated, EGL pBuffer surfaces are allocated from the VGImages, and the contents of the Pixmaps are stored in the off-screen buffers 250 and 255. The contents stored in the off-screen buffers 250 and 255 may be moved to the on-screen surface 260 and displayed on the screen.

Figure 3:
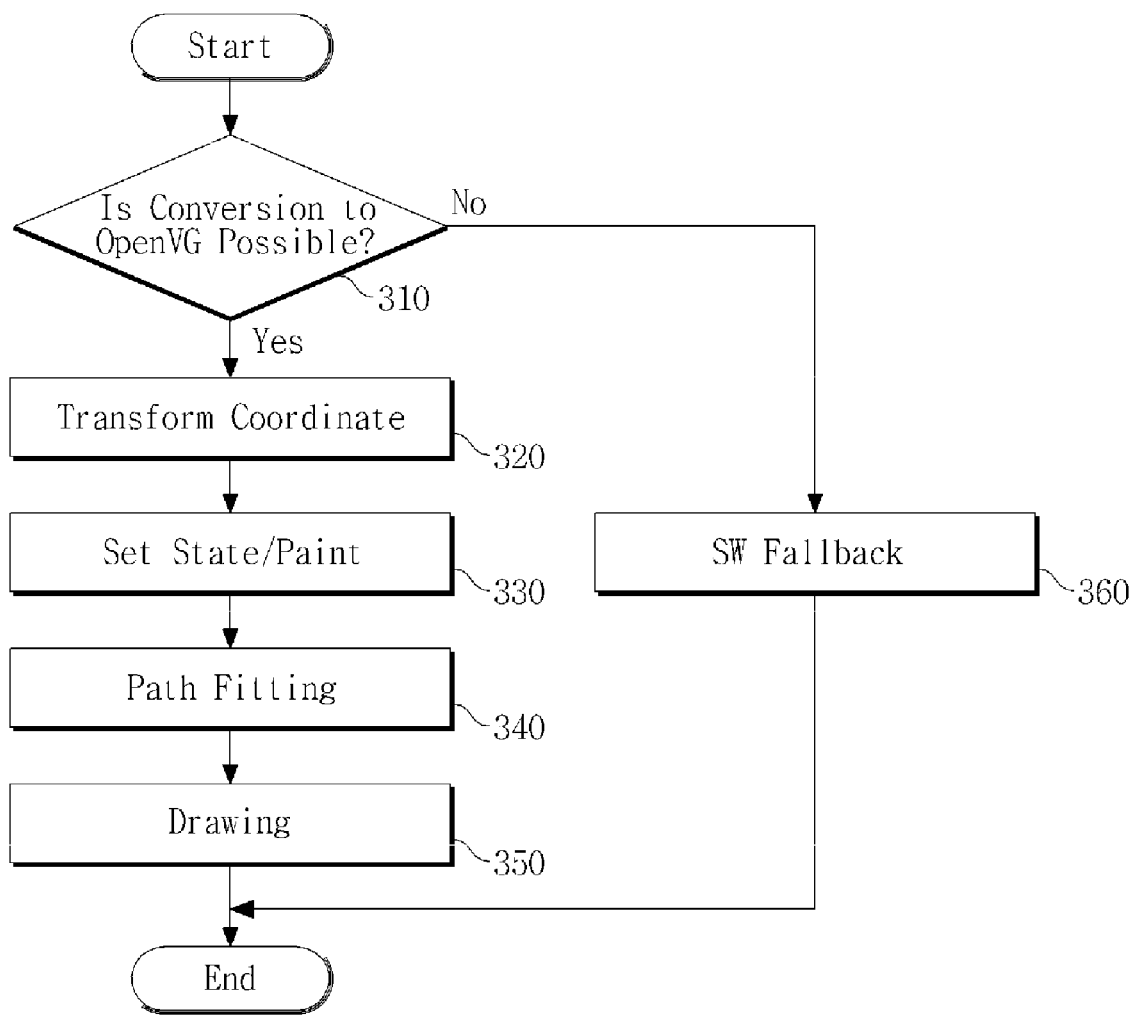
FIG. 3 is a flowchart illustrating an exemplary core rendering method.

FIG. 3 is a flowchart illustrating an exemplary core rendering method.

Core rendering is performed by the device-dependent processor (DDX 2D) 142, and basic 2D graphics processing of a window system for core rendering may be implemented according to OpenVG. A determination is made if data for graphics processing can be converted into an OpenVG format (310). If data for graphics processing cannot be converted into an OpenVG format, a software (SW) fallback runs so that a CPU, instead of a GPU, performs the graphics processing (360).

In operation 360, the content of an EGL surface of the GPU is copied to the memory of the CPU. Graphics data stored in the memory of the CPU is converted into a format which can be processed by fb functions, a fb function corresponding to a drawing function requested by a client is called, and the fb function processing results are stored in the memory of the CPU. The processing results are transferred to the EGL surface of the GPU. As used herein, fb function, for example, a fall back function, is well known to one skilled in the art.

If data for graphics processing is convertible into an OpenVG format, a coordinate transform is performed (320). 2D primitives defined in the window coordinate system are transformed into the OpenVG coordinate system, as the OpenVG coordinate system (wherein the origin is located at the bottom left corner) may differ from the window coordinate system. Additionally, the content of the graphics context is expressed as state objects and paint objects based on the OpenVG format (330). In the Open VG format, state objects may be used to represent the properties of 2D primitives and the paint objects may be used to display the pattern of 2D primitives. The state objects, for example, may be background colors, foreground colors, line color/thickness, and the like.

Path fitting is performed according to path objects (340). That is, by fitting the shapes of the 2D primitives according to path objects, an output corresponding to the graphics context may be obtained. For example, a rectangle is drawn by a path representing its outline, a state, and a paint object representing its color and its pattern.

A command for actually drawing a picture may be executed (350), according to prepared graphics data. Rendering according to vgDrawPath or vgDrawingImage (referred to as perform rendering) is stored in the EGL surface of the GPU.

The render extension 144, the OpenVG extension 146 and the EGL extension 148 are described below.

A variable type "Picture" may be used by the render extension 144. The picture may be associated with a drawable, such as a Window or a Pixmap, to which an EGL surface has been allocated, and accordingly to which no other EGL surface has been allocated.

In response to a trapezoid or triangle being designated as a parameter of a picture, the shape of the trapezoid or triangle is fitted by setting up a path. Also, the picture may be transformed into an OpenVG variable type according to the feature of the picture. One example of render extension is blending. If both a source image and a mask image are solid, color paint is selected, and if either one of the source image and mask image is solid, pattern painting with color transformation is selected. As used herein "solid" may refer to filling an inner area of an object with, for example, a single color. If both the source image and mask image are drawable, vgMask and pattern paint are selected.

PictureTransform may be implemented by setting up a PAINT_TO_USER matrix. The PAINT_TO_USER matrix may be expressed according to Equation 1:

$$\left(\begin{pmatrix}1 & 0 & 0\\0 & -1 & h_1\\0 & 0 & 1\end{pmatrix}P\begin{pmatrix}1 & 0 & -d_x+s_x\\0 & -1 & h+s_y-d_y\\0 & 0 & 1\end{pmatrix}\right)^{-1} \quad (1)$$

where $s_x$, $s_y$, $d_x$ and $d_y$ are values designated by a composite window, $h_i$ is the height of a source or mask image, and h is the height of a destination surface.

Further to setting up a path and a paint object as described above, vgDrawPath is called and the rendering may be stored in the EGL surface of the GPU.

The OpenVG extension 146 and the EGL extension 148 are described below. Through the OpenVG extension 146 and the EGL extension 148, a client application may enable implementation of a GUI application for OpenVG and EGL APIs.

OpenVG and EGL APIs requested by the client application may be transferred to a server through the protocol processor 122. If the OpenVG/EGL API requested by the client application causes a change of a global state or of contexts, the state and contexts are stored in a module of the server instead of calling a function that may change the state. If the client application calls a drawing-associated API, the state and contexts stored in the server are accessed, and the drawing-associated API is executed.

The resources requested by the client application and created by the server are managed by a reference counter. The resources may be erased from the server if they are not used by a module. If a request for erasing the resources is issued while the server is in use, the reference count number is decreased and the resources are erased when the use of the server is terminated.

According to one example, memory virtualization of the GPU may be implemented. That is, if all graphics resources of the window system cannot be stored in the GPU, memory swapping may be performed such that the memory of the CPU is used in place of the memory of the GPU.

For example, when graphics resources are moved from the GPU to the CPU, a VGImage not used most recently, that is, a VGImage that has not been accessed for the longest period of time is selected and moved to the memory of the CPU. The selected VGImage is erased from the memory of the GPU, and a surface of a Drawable is stored in the memory of the CPU.

When a graphic resource moved to the memory of the CPU is accessed, the VGImage is allocated in the GPU and associated with a surface of the Drawable. The content of the surface stored in the memory of the CPU is copied to the VGImage allocated in the GPU, and the surface is erased from the memory of the CPU.

According to an exemplary aspect, by using a standardized API, expandability and flexibility of a window system can be improved. Also, by using a vector-based API, it is possible to more effectively support scalable user interfaces which are expected to be widely used in the future.

In addition, by implementing a window system through a separate graphics processing unit (GPU) instead of performing graphics processing using a single high-performance central processing unit (CPU) alone, a greater variety of natural graphics effects can be obtained.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A graphics processing method of a graphics processing unit (GPU), the method comprising:
converting a graphics processing of a window system into a vector-based application program interface (API) format accessible by the GPU; and
performing, by the GPU, the converted graphics processing,
wherein the vector-based API format is based on an OpenVG standard or an Embedded Graphics Library (EGL) standard, and
in response to the vector based API format being based on the EGL standard, graphics resources for performing the graphics processing of the window system are managed by an EGL surface and the EGL surface is implemented by an EGL extension.

2. The method of claim 1, wherein, in response to the vector based API format is based on the OpenVG standard, the converting of the graphics processing further comprises:
transforming a coordinate system of the window system to an OpenVG coordinate system;
expressing contexts for the graphics processing of the window system as OpenVG objects;
performing the graphics processing with the OpenVG objects; and
storing the output of the graphics processing.

3. The method of claim 2, wherein the expressing contexts for the graphics processing of the window system as the OpenVG objects further comprises:
expressing contents of the contexts for the graphics processing of the window system as state objects, paint objects and path objects based on the OpenVG standard.

4. The method of claim 1, further comprising:
in response to the graphics processing not being processable by the GPU, transferring contents of contexts for the graphics processing to a central processing unit (CPU) and performing the graphics processing in the CPU.

5. The method of claim 1, wherein the GPU exchanges graphics resources with a central processing unit (CPU), and the GPU accesses a memory of the CPU.

6. A graphics processing method of a graphics processing unit (GPU), the method comprising:
converting a graphics processing of a window system into a vector-base application program interface (API) format accessible the GPU; and
performing, by the GPU, the converted graphics processing,
wherein the GPU exchanges graphics resources with a central processing unit (CPU), and the GPU accesses a memory of the CPU, and the GPU transfers graphics resources that have not been accessed for a longest period of time to the memory of the CPU as a VGImage.

7. A graphics processing method of a graphics processing unit (GPU), the method comprising:
converting a graphics processing of a window system into a vector-base application program interface (API) format accessible the GPU; and
performing, by the GPU, the converted graphics processing,
wherein the GPU exchanges graphics resources with a central processing unit (CPU), and the GPU accesses a memory of the CPU, and, in response to an access to the graphics resources transferred to the memory of the CPU being performed, the GPU loads the graphics resources into GPU memory as a VGImage.

* * * * *